United States Patent
Kumar et al.

(10) Patent No.: US 10,824,643 B2
(45) Date of Patent: Nov. 3, 2020

(54) DATA REPLICATION IN A DATABASE ENVIRONMENT

(71) Applicant: International Business Machines Corporation, Armonk, NY (US)

(72) Inventors: Nirmal Kumar, Bangalore (IN); Girish V. Mattur, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 15/813,828

(22) Filed: Nov. 15, 2017

(65) Prior Publication Data
US 2019/0147097 A1 May 16, 2019

(51) Int. Cl.
*G06F 17/00* (2019.01)
*G06F 16/27* (2019.01)
*G06F 9/30* (2018.01)
*G06F 12/0862* (2016.01)
*G06F 16/23* (2019.01)

(52) U.S. Cl.
CPC ........ *G06F 16/275* (2019.01); *G06F 9/30047* (2013.01); *G06F 12/0862* (2013.01); *G06F 16/2308* (2019.01)

(58) Field of Classification Search
None
See application file for complete search history.

(56) References Cited

U.S. PATENT DOCUMENTS

| | | | | |
|---|---|---|---|---|
| 5,963,945 A | * | 10/1999 | Pal ..................... | G06F 9/5011 |
| 6,701,359 B1 | * | 3/2004 | Calabrez ............. | H04L 41/0206 370/241 |
| 2011/0320403 A1 | * | 12/2011 | O'Krafka ............. | G06F 16/273 707/620 |
| 2012/0185432 A1 | * | 7/2012 | Ding ................... | G06F 16/273 707/620 |
| 2013/0268734 A1 | * | 10/2013 | Hotz .................... | G06F 16/172 711/133 |
| 2014/0019688 A1 | * | 1/2014 | Ghodsnia ............. | G06F 12/0897 711/135 |

(Continued)

OTHER PUBLICATIONS

Robert Hodges, "Solving Replication Lag with Tungsten Slave Prefetch," The Scale-Out Blog, http://scale-out-blog.blogspot.in/2012/02/solving-replication-lag-with-tungsten.html, Feb. 26, 2012.

(Continued)

*Primary Examiner* — Hung D Le
(74) *Attorney, Agent, or Firm* — North Shore Patents, P.C.; Joseph L. Acayan

(57) ABSTRACT

Embodiments generally relate data replication in databases. In some embodiments, a method includes accessing transaction information from a staging store at a first database. The method further includes determining one or more records to be prefetched from a hard disk of a second database based on the transaction information. The method further includes prefetching the one or more records to be prefetched from the hard disk. The method further includes storing the one or more prefetched records in a memory of the second database. The method further includes updating the one or more records stored in the second database based on the transaction information.

11 Claims, 6 Drawing Sheets

(56) References Cited

U.S. PATENT DOCUMENTS

| | | | |
|---|---|---|---|
| 2014/0032852 A1* | 1/2014 | Lightstone | G06F 12/121 711/135 |
| 2015/0012608 A1* | 1/2015 | Ishikawa | H04L 67/28 709/213 |
| 2016/0203050 A1 | 7/2016 | Hrle et al. | |
| 2016/0314147 A1 | 10/2016 | Romine | |

OTHER PUBLICATIONS

List of IBM Patents or Applications Treated as Related.

* cited by examiner

US 10,824,643 B2

DATA REPLICATION IN A DATABASE ENVIRONMENT

BACKGROUND

Database replication involves frequent, incremental copying of data from one database to another database in a continuous manner. This enables all end users to access, share, and update the same information. A result of database replication is a distributed database, where users can access relevant data without interfering with the work of other users. Database replication is also useful for database recovery and migration.

SUMMARY

Disclosed herein is a method for replicating data in databases, and a system and computer program product as specified in the independent claims. Embodiments are given in the dependent claims. Embodiments can be freely combined with each other if they are not mutually exclusive.

Embodiments improve data replication and user access to data in databases. Data replication in a database is improved by intelligently prefetching replicated data from a hard disk of a target database. User access to data in a database is improved by storing prefetched data in memory for immediate access.

In an embodiment, a method includes accessing transaction information from a staging store at a first database. The method further includes determining one or more records to be prefetched from a hard disk of a second database based on the transaction information. The method further includes prefetching the one or more records to be prefetched from the hard disk. The method further includes storing the one or more prefetched records in a memory of the second database. The method further includes updating the one or more records stored in the second database based on the transaction information.

In another embodiment, the transaction information includes data changes and database operations associated with one or more records stored at the first database. In another aspect, the transaction information includes database operations associated with one or more records stored at the first database, and where the database operations include one or more of selecting, inserting, updating, and deleting data associated with the one or more records stored at the first database. In another aspect, the updating of the one or more records stored in the second database includes determining a sequence of database operations and data changes associated with each record that has been updated in the first database, and updating the one or more records stored in the second database in a same sequence that corresponding records stored in the first database were updated. In another aspect, the prefetching of the one or more records to be prefetched further includes prefetching a plurality of records substantially simultaneously. In another aspect, the prefetching of the one or more records to be prefetched is performed before runtime. In another aspect, the prefetching of the one or more records to be prefetched is performed during a mirroring phase.

DETAILED DESCRIPTION

Embodiments described herein facilitate data replication and user access to data in databases. As described in detail herein, various embodiments improve data replication in databases by intelligently prefetching replicated data from a hard disk of a target database. This improves user access to data in a database because accessing prefetched data stored in memory is many times faster than accessing data from a hard disk.

In some embodiments, a system such as a database server associated with a target database accesses transaction information from a staging store at a first database. The transaction information includes historical information associated with data updates at a source database. As described in more detail herein, the system determines records to be prefetched from a hard disk of the target database based on the transaction information. The system then prefetches the records to be prefetched from the hard disk, and then stores the one or more prefetched records in a memory of the target database. Such prefetching occurs before runtime so that a cognitive target apply unit may immediately access desired data during runtime. The system updates the records stored in a target database based on the transaction information. For example, the system updates records at the target database in the same manner (e.g., same updates, same update sequences, etc.) as corresponding records at the source database. In various embodiments, the system updates the records in the memory of the target database for immediate access. The system may asynchronously update the records the hard disk of the target database.

Figure 1:
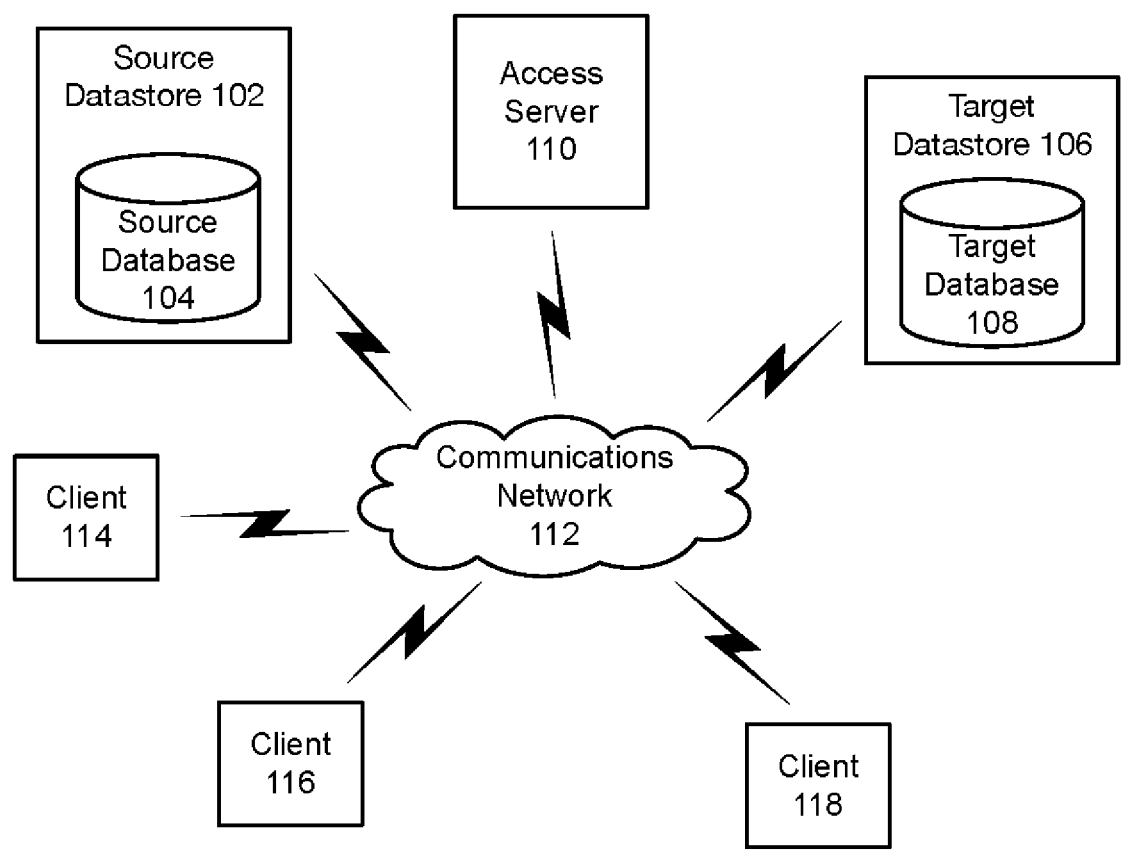
FIG. 1 is an example replication environment including a source datastore with a source database, and a target datastore with a target database, according to some embodiments.

FIG. 1 is an example replication environment 100 including a source datastore 102 with a source database 104, and a target datastore 106 with a target database 108, according to some embodiments. Also shown is an access server 110 and clients 114, 116, and 118. In various embodiments, the source datastore 102, the source database 104, the target datastore 106, the target database 108, the access server 110, and the clients 114, 116, and 118 may communication with each other via communications network 112, or any other suitable network.

In various embodiments, users may use client devices (e.g., clients 114 and 116, etc.) to access the source database 104 to enter and update data in parallel. Users may also use client devices (e.g., client 118, etc.) to access the same data in the target database 108, and may use the data to run various applications such as business applications, analytics applications, etc., without interfering with usage of the source database 104. Example embodiments and operations are described in more detail herein.

In some embodiments, the access server 110 controls all non-command line access to the replication environment. An administrator user logs into a management console associated with the access server 110 in order to configure or manage the replication processes. The access server 110 may manage replication processes without affecting active data replication activities between the source datastore 102 and the target datastore 106.

While some embodiments described herein may be described in the context of a database server associated with the target database 108 performing various actions, other servers such as access server 110 may also perform various embodiments described herein. In various embodiments, any suitable component or combination of components associated with the target database 108, the target datastore 106, and/or the access server 110, or any suitable processor or processors associated with these servers may facilitate performing the embodiments described herein. In various embodiments, the environment 100 may not have all of the components shown and/or may have other elements including other types of components instead of, or in addition to, those shown herein.

Figure 2:
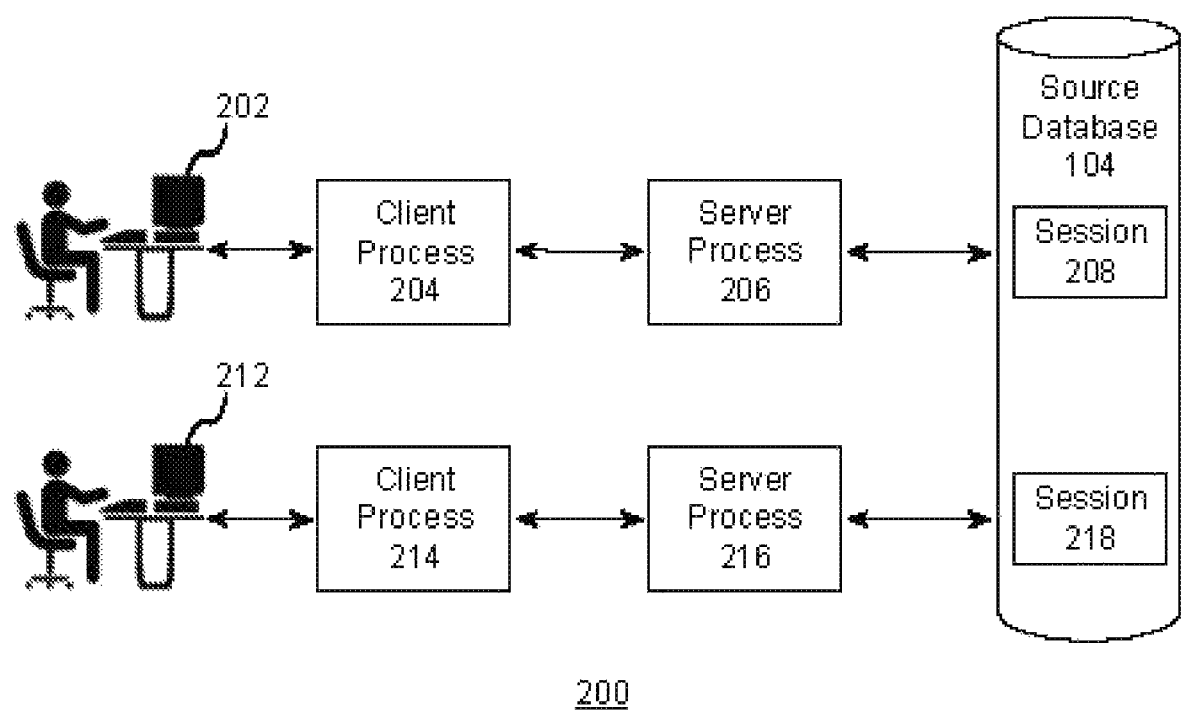
FIG. 2 is an example environment for updating a source database, according to some embodiments.

FIG. 2 is an example environment 200 for updating the source database 104, according to some embodiments. As indicated herein, in various embodiments, users may access the source database 104 to enter and update data in parallel. For example, a business may sell products online and may utilize the source database 104 to manage customer accounts, product sales, etc. A user such as a consumer may use a client device 202 to access the source database 104 to set up an account, purchase products, etc. There are processes (e.g., client process 204, server process 206, etc., that enable a variety of transactions during a particular session 208. Such transactions result in information or data in the source database 104 being selected, added, changed, deleted, etc.

As indicated herein, multiple users may access the source database 104 in parallel. For example, another user may use a client device 212 to access the source database 104 to also set up an account, purchase products, etc. Again, there are processes (e.g., client process 214, server process 216, etc., that enable transactions during a particular session 218, which result in information or data in the source database 104 being selected, added, changed, deleted, etc.

In various embodiments, the environment 200 may not have all of the components shown and/or may have other elements including other types of components instead of, or in addition to, those shown herein.

Figure 3:
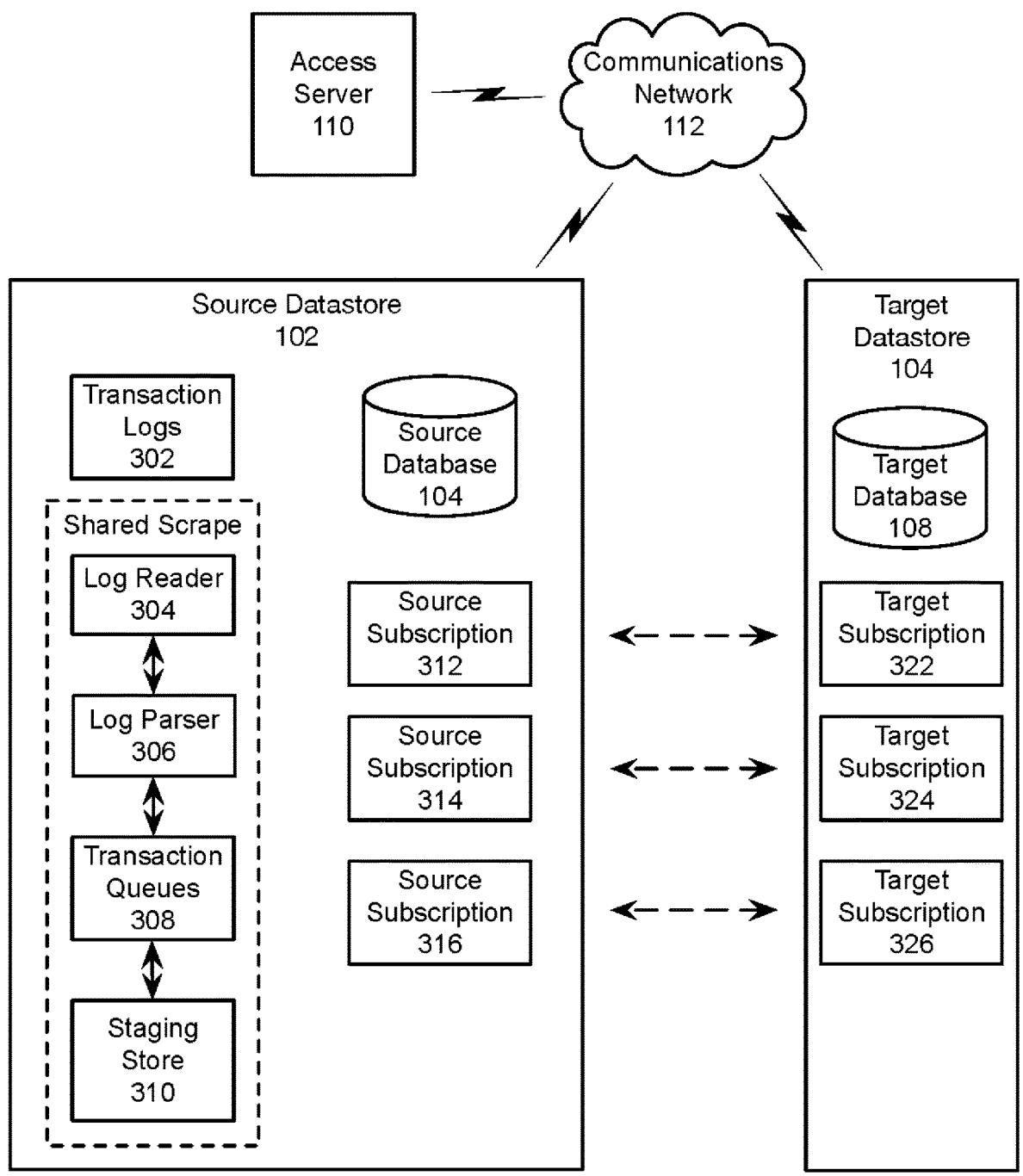
FIG. 3 is an example environment for updating a source database and replicating data at a target database, according to some embodiments.

FIG. 3 is an example environment 300 for updating the source database 104 and replicating data at the target database 108, according to some embodiments. Also shown are the source datastore 102 and the target datastore 104, which communicate with each other and with the access server 110 via the communications network 112. The following descriptions detail embodiments associated with the updating of the source database 104 and replicating data at the target database 108.

In various embodiments, when data is added, deleted, changed, etc. at the source database 104, these transactions are tracked and logged in transaction logs 302. Also shown are a log reader 304, a log parser 306, transaction queues 308, and a staging store 310.

In various embodiments, the environment 300 may not have all of the components shown and/or may have other elements including other types of components instead of, or in addition to, those shown herein.

In various embodiments, transaction information in the transaction logs 302 includes information on each record of the tables of the source database 104 that have been modified. In various embodiments, the tables are tables at a subscription level, where the system maintains transaction queues, which are described in the transaction information. Information in these transaction logs 302 may be scraped for data replication, as well as other purposes.

The log reader 304 reads the entire transaction log and sends in-scope logs or entries (e.g., logs for replication) to the log parser 306. In some embodiments, the log reader 304 filters the log records from the transaction logs 302 in order to send just the in-scope log entries to the log parser 306. A transaction log may also be referred to as a database log, database recovery log, archive log, or redo log.

The log parser 306 reads the log entry queues from the transaction logs 302, parses the in-scope logs, parses row level operations, and stages transactions including data changes and associated database operations as log entries in a queue until complete (e.g., until an entry for a commit operation is shown). The log parser 306 then decodes the operations into the parsed entry queue. The log parser 306 puts the transactions into the transaction queues 308.

The transaction queues 308 store all of the data for all in-scope transactions (both committed and uncommitted), and once committed, send the data to the staging store 310. Each transaction queue of the transaction queues 308 includes data manipulation language (DML) statements that modify stored data but not the schema or database objects. For example, the DML statements may be used for selecting, inserting, updating, and deleting data in a database such as source database 104. DML provides a straightforward approach for managing records by providing simple statements to insert, update, merge, delete, and restore records.

In various embodiments, the system records a particular sequence of data manipulations in transaction queues, including, for example, inserting, updating, deleting, etc. for each and every transaction that occurs in the source database. Once a transaction is committed, the transaction is recorded in the transaction logs, which are stored in the staging store 310. The terms staging store, staging store repository, and change log may be used interchangeably. The staging store 310 holds committed transactions on the source database 104 waiting for the subscriptions to confirm that the target database 108 has applied the transactions.

Also shown are source subscriptions 312, 314, and 316. In various embodiments, a subscription is a connection that is used to replicate data between the source database 104 and the target database 108. Each of subscriptions 312, 314, and 316 contains details of respective transactions (e.g., a set of tables and their columns along with other change data capture (CDC) properties such as filter/user exit, expressions, etc.) that are being replicated; and each of subscriptions 322, 324, and 326 contains details of how the source data is applied to the target.

In various embodiments, CDC replication captures database changes as they happen and delivers the database changes to the target database 108. CDC replication replicates the source data at the target database 108 while maintaining the transactional consistency. CDC replication to the target database 108 results in the same changes that occurred at the source database 104.

In various implementations, a shared scrape or single scrape reads parsed log entries, and encodes the operations into network transport packets and sends them to the target database 108 through the communications network 112. Transmission may utilize transmission control protocol/Internet protocol (TCP/IP) or any other suitable communication protocols.

When the data is transferred from the source database 104 to the target database 108, the data can be remapped and/or transformed in the target environment. For example, if there are 100 tables in the source database 104, and a user selects 10 or 20 tables to replicate, these 10 or 20 tables will be called in-scope tables, which are part of the replication and which are to be replicated from the source database 104 to the target database 108.

In various embodiments, subscriptions are mapped between source tables to target tables. Subscriptions on the source side are called source subscriptions (e.g., source subscriptions 312, 314, and 316) and subscriptions on the target side are called target subscriptions (e.g., target subscriptions 322, 324, and 326). Subscriptions also hold information about the type of mapping, for instance, standard, adaptive apply, or live audit, etc.

In various embodiments, for each subscription, tables stored in the source database 104 are associated with and mapped to tables stored in the target database 108. The table structures are the same on both mapped tables, though may differ depending on the particular implementations and requirements. For example, the number of columns can be more or less the same depending upon the requirements.

Figure 4:
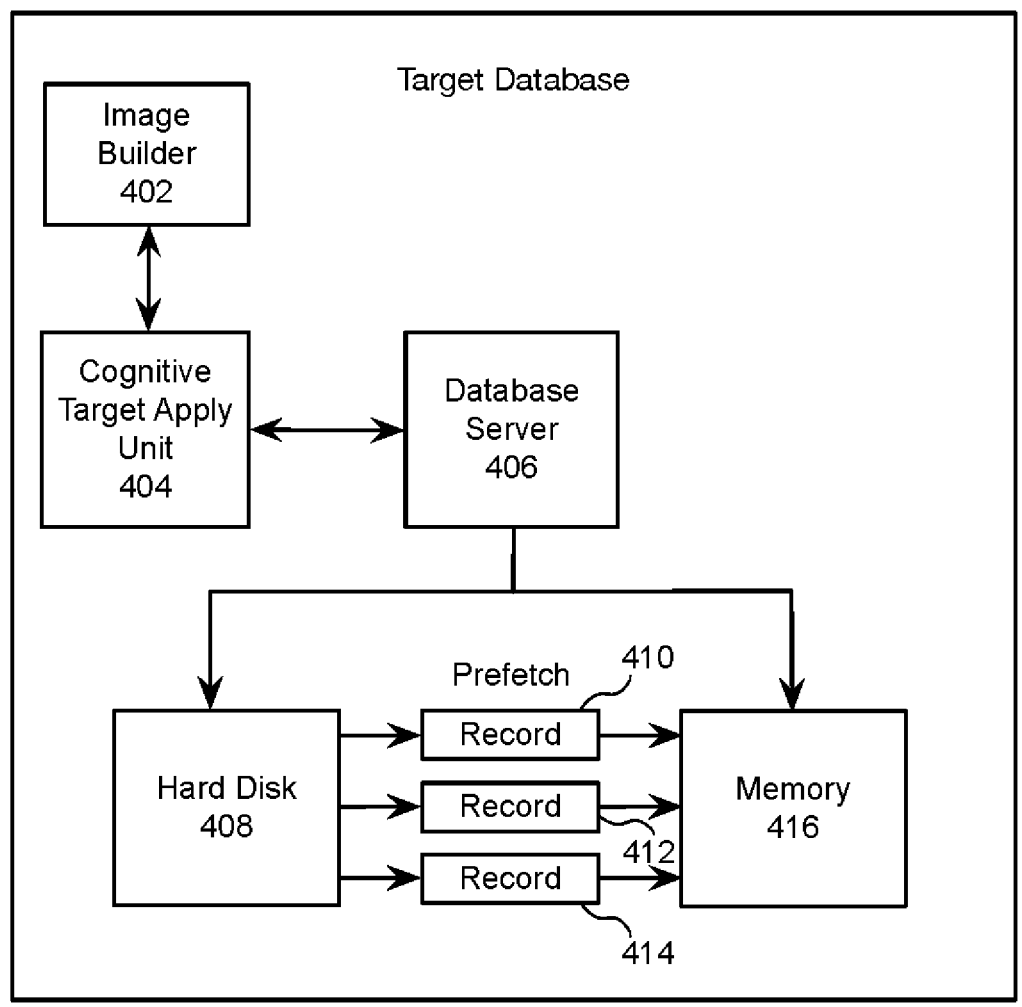
FIG. 4 is an example target database, according to some embodiments.

FIG. 4 is an example target database 108, according to some embodiments. The following descriptions detail embodiments associated with operations of the target database 108, including data replication and prefetching. Also shown are an image builder 402, a cognitive target apply unit 404, a database server 406, a hard disk 408, records 410, 412, and 414, and a memory 416.

In various embodiments, the target database 108 may not have all of the components shown and/or may have other elements including other types of components instead of, or in addition to, those shown herein.

The image builder 402 formats DML statements to be applied at the target database 108. The cognitive target apply unit 404 maintains a history of transactions and their records from the staging store at the source datastore 102, and prefetches those records just before applying the transactions to the target database 108.

In various embodiments, the database server 406 may function to fetch the transaction logs 302 and any other information (e.g., CDC information, etc.) from the source datastore 102 and/or source database 104. The database server 406 may perform various functions associated with replicating data from the source database 104 to the target database 108. For example, database server 406 physically locates a requested record on data files stored on the hard disk 408, reads from the hard disk 408, and copies the record into the memory 416.

The memory 416 refers to random access memory (RAM). The memory 416 can be accessed hundreds of times faster than a hard drive, which is why active programs are loaded into the memory. The database server 406 can access records stored in the memory 416 nearly instantly. In contrast, items stored on the hard disk 408 need to be located, read, and then sent to the memory 416 before being processed. Data records are typically stored on the hard disk 408 (in data files). The terms hard disk and disk are used interchangeably. The hard disk may also be referred to as non-volatile memory. If a record has not been accessed and is not present in the memory 416, the database server 406 performs physical disk input-output (TO) operations, which include locating the record on the hard disk 408, reading that record (e.g., record 410, 412, or 414), and then copying the record into the memory 416 for processing. The database server 406 can then read the record directly from the memory 416, also referred to as a logical IO operation. A logical IO operation is hundreds of times faster than a physical IO operation. As described in more detail herein, in various embodiments, the system updates the records in the memory of the target database for immediate access. These updates are based on the transaction information retrieved from the staging store 310. The system may asynchronously update the records the hard disk of the target database.

When the user tries to read a record of a table, the user sends a command or simple statement (e.g., SELECT employee, name, salary from employee where employee ID=100) to the database server 406, and can then view the record when the database server 406 returns the record. This request-response process occurs instantly, as the requested record is already prefetched and stored in the memory 416. In various embodiments, once a record is stored in the memory 416, the database server 406 may send the record to the user as a response to the user request for the record. The user can then see the record. In various embodiments, the cognitive target apply unit 404 may fire a SELECT statement based on a table key using the information from staging store 310 and will pre-fetch the records from hard disk 408 into the memory 416 bit earlier or in advance (before runtime) so that the cognitive target apply unit 404 can update those records in the memory 416 in a fast manner.

Figure 5:
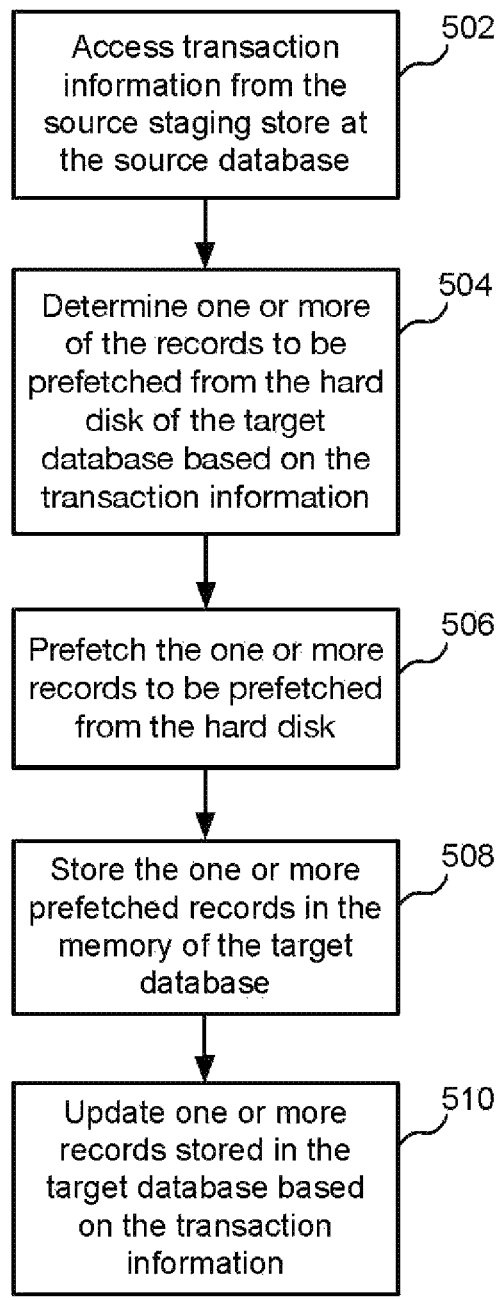
FIG. 5 is an example flow diagram for replicating data in databases, according to some embodiments.

FIG. 5 is an example flow diagram for replicating data in databases, according to some embodiments. As indicated herein, various embodiments improve data replication in databases by intelligently prefetching replicated data from a hard disk of a target database. This improves cognitive target apply unit 404 access to data in a database because accessing prefetched data stored in memory is many times faster than accessing data from a hard disk.

Referring to both FIGS. 3, 4, and 5, a method begins at block 502, where a system such as a database server associated with target datastore 106 accesses transaction information from the staging store 310 at the source database 104. In some embodiments, access server 110 may facilitate and/or manage and/or perform various embodiments and described herein. In some embodiments, the transaction information includes data changes and database operations associated with one or more records stored at the source database. For example, in various embodiments, the database operations include one or more of selecting, inserting, updating, and deleting data associated with the one or more records stored at the source database.

At block 504, the system determines one or more of the records 410, 412, and 414 to be prefetched from the hard disk 408 of the target database 108 based on the transaction information.

At block 506, the system prefetches the one or more records 410, 412, and 414 to be prefetched from the hard disk 408. In some embodiments, the prefetching of the one or more records to be prefetched further includes prefetching multiple records substantially simultaneously. In various embodiments, the prefetching of the one or more records to be prefetched is performed before runtime. As described herein, this enables the cognitive target apply unit 404 to access records immediately during runtime. In some embodiments, the prefetching of the one or more records to be prefetched is performed during a mirroring phase.

As indicated herein, the staging store holds all information needed to replicate records at the target database 108, including the order of transactions. This information provides a full history of source transactions. Prefetching may be done using the keys of the tables, which the system also stores in metadata. In some embodiments, the prefetching logic is on the target side and the staging store repository assists for each and every record that needs to be prefetched.

At block 508, the system stores the one or more prefetched records 410, 412, and 414 in the memory 416 of the target database 108.

At block 510, the system updates one or more records (e.g., records 410, 412, and 414, etc.) in the memory 416 of the target database 108 based on the transaction information. In some embodiments, when updating the one or more records stored in the target database, the system determines a sequence of database operations and data changes associated with each record that has been updated in the source database. The system also updates the one or more records stored in the target database in a same sequence that corresponding records stored in the source database were updated. In other words, records are already brought from the hard disk 408 into the memory 416, and the cognitive target apply unit 404 may fire the update/delete and updates the records. The database process may asynchronously writes to data files on the hard disk 408.

After the prefetched records 410, 412, and 414 in the memory 416 are updated those prefetched records identical to the corresponding records stored at the source database 104. As indicated herein, the target apply may then access and process records instantly, which increases throughput and efficiency for users.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

The following describes additional embodiments that may be applied and/or combined with other embodiments described herein. In some embodiments, the replication process may occur in phases. For example, in an initial synchronization phase, initial data is synchronized from source database 104 to the target database 108 when the source database 104 is interacting with users, and inserts/updates/deletes are performed in parallel when the refresh is running. During the initial synchronization phase, the transaction logs are generated. The initial synchronization phase may also be referred to as a "refresh while active" phase.

A mirroring phase, or continuous mirroring phase, is a second phase of replication that occurs after the initial synchronization phase. The transaction logs are scraped, and incremental changes are sent to the target database on a continuous basis. Embodiments described herein are applied in the mirroring phase.

In some embodiments, the system performs the replication of changes to target tables in the target database. The system may also accumulate source table changes, and replicate those changes to the target table at a later time. If bidirectional replication is implemented, mirroring can occur to and from both the source and target tables.

In some embodiments, after a refresh, changes in the transaction log are read and sent to a target database on a continuous basis. As its name implies, continuous mirroring replicates changes to the target database on a continuous basis. During the mirroring phase, and after a replication source engine captures the change data from the database transaction logs, committed change data is placed into replication metadata in a "replication transaction repository." The replication transaction repository stores the data and metadata both for each transaction in the same fashion as it occurred in the source database. After committed data is stored in the replication transaction repository, the committed data may be sent to a target replication engine where the target engine may apply the DMLs in the target database row-by-row and in the same sequence as it occurred on the source database. During a target apply, especially for the update and delete operations, the rows are read from the hard disk 408 and brought into the memory 416 and then DML statements (e.g., update, delete, etc.) get executed in the memory 416.

Figure 6:
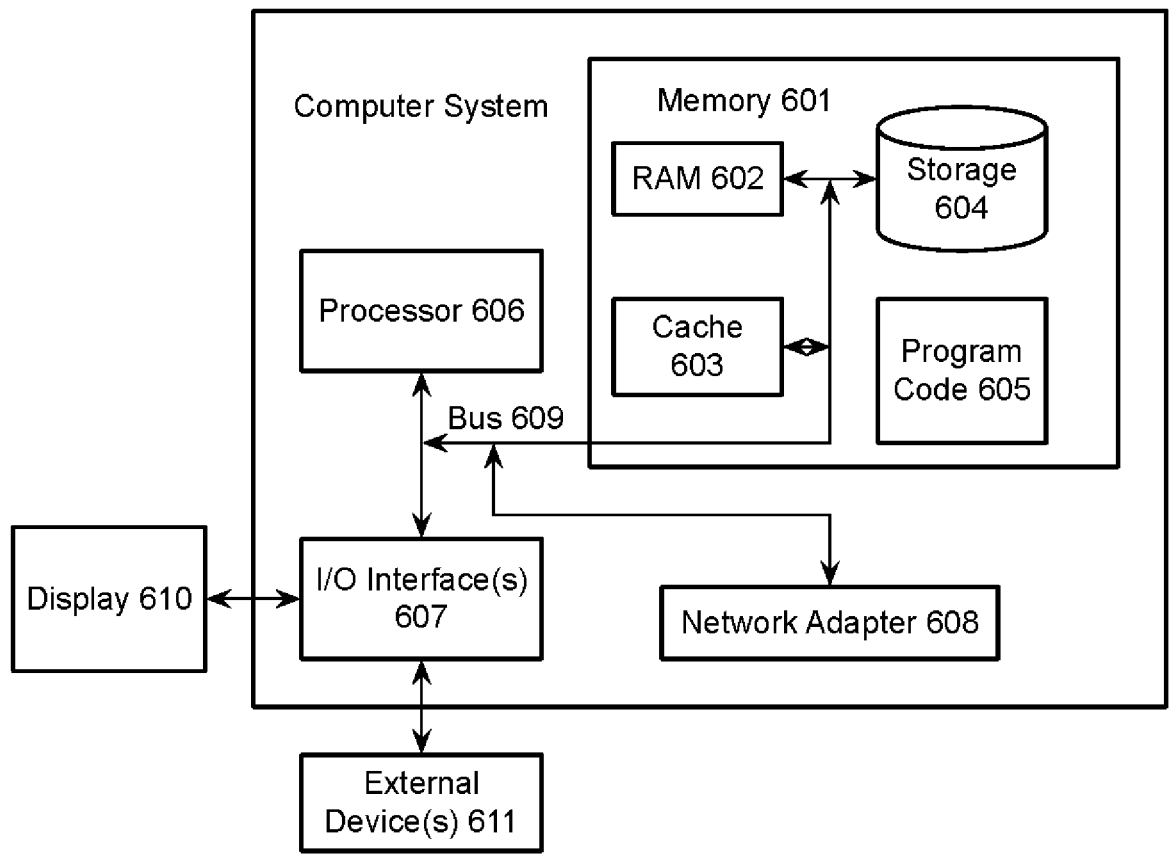
FIG. 6 is a block diagram of an example computer system, which may be used for embodiments described herein.

FIG. 6 is a block diagram of an example computer system 600, which may be used for embodiments described herein. The computer system 600 is operationally coupled to one or more processing units such as processor 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or storage 604, which may include non-volatile storage media or other types of memory. The memory 601 may include at least one program product having a set of at least one program code 605 that are configured to carry out the functions of embodiment of the present invention when executed by the processor 606. The computer system 600 may also communicate with a display 610 or one or more other external devices 611 via I/O interfaces 607. The computer system 600 may communicate with one or more networks, such as communications network 112, via network adapter 608.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
comprising at least one processor and a computer readable storage medium having program instructions embodied therewith, the program instructions executable by the first processor to cause the at least one processor to perform operations comprising:
accessing transaction information from a staging store at a first database;
determining one or more records to be prefetched from a hard disk of a second database based on the transaction information;
prefetching the one or more records to be prefetched from the hard disk, wherein the prefetching of the one or more records to be prefetched is performed before runtime;
storing the one or more prefetched records in a memory of the second database; and
updating the one or more records stored in the second database based on the transaction information.

2. The system of claim 1, wherein the transaction information includes data changes and database operations associated with one or more records stored at the first database.

3. The system of claim 1, wherein the transaction information includes database operations associated with one or more records stored at the first database, and wherein the database operations comprise one or more of inserting, updating, and deleting data associated with the one or more records stored at the first database.

4. The system of claim 1, wherein to update the one or more records stored in the second database, the at least one processor further perform operations comprising:
   determining a sequence of database operations and data changes associated with each record that has been updated in the first database; and
   updating the one or more records stored in the second database in a same sequence that corresponding records stored in the first database were updated.

5. The system of claim 1, wherein the prefetching of the one or more records to be prefetched further comprises prefetching a plurality of records substantially simultaneously.

6. The system of claim 1, wherein the prefetching of the one or more records to be prefetched is performed during a mirroring phase.

7. A computer program product for replicating data in databases, the computer program product including at least one computer readable storage medium having program instructions embodied therewith, the program instructions executable by at least one processor to cause the at least one processor to perform operations comprising:
   accessing transaction information from a staging store at a first database;
   determining one or more records to be prefetched from a hard disk of a second database based on the transaction information;
   prefetching the one or more records to be prefetched from the hard disk, wherein the prefetching of the one or more records to be prefetched is performed before runtime;
   storing the one or more prefetched records in a memory of the second database; and
   updating the one or more records stored in the second database based on the transaction information.

8. The computer program product of claim 7, wherein the transaction information includes data changes and database operations associated with one or more records stored at the first database.

9. The computer program product of claim 7, wherein the transaction information includes database operations associated with one or more records stored at the first database, and wherein the database operations comprise one or more of inserting, updating, and deleting data associated with the one or more records stored at the first database.

10. The computer program product of claim 7, wherein to update the one or more records stored in the second database, the at least one processor further performs operations comprising:
   determining a sequence of database operations and data changes associated with each record that has been updated in the first database; and
   updating the one or more records stored in the second database in a same sequence that corresponding records stored in the first database were updated.

11. The computer program product of claim 7, wherein the prefetching of the one or more records to be prefetched further comprises prefetching a plurality of records substantially simultaneously.

\* \* \* \* \*